United States Patent
Anderson et al.

(10) Patent No.: US 6,468,458 B1
(45) Date of Patent: *Oct. 22, 2002

(54) METHOD FOR FORMING A COMPOSITE PRODUCT

(75) Inventors: Terry L. Anderson, Macomb Township; Nelson J. Morren, Hudsonville; Glen J. Jeffrey, Farmington Hills, all of MI (US)

(73) Assignee: Textron Automotive Company Inc,, Troy, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/178,117

(22) Filed: Oct. 23, 1998

(51) Int. Cl.[7] ................................. B29C 45/16
(52) U.S. Cl. .......... 264/246; 264/245; 264/255; 264/267; 264/294; 264/328.8; 425/588; 425/576; 425/112
(58) Field of Search ............... 264/425, 255, 264/267, 294, 297.3, 328.8, 246; 475/588, 576; 428/112

(56) References Cited

U.S. PATENT DOCUMENTS

| 3,363,039 A | * | 1/1968 | Nagai et al. ................. 264/245 |
| 3,807,920 A |   | 4/1974 | Aoki |
| 3,809,733 A |   | 5/1974 | Shandiford et al. |
| 4,349,592 A |   | 9/1982 | Nussbaum |
| 4,396,680 A |   | 8/1983 | Chang |
| 4,451,522 A |   | 5/1984 | de Vroom |
| 4,460,530 A |   | 7/1984 | Hanson et al. |
| 4,681,811 A |   | 7/1987 | Simpson et al. |
| 4,755,333 A |   | 7/1988 | Gray |
| 5,007,822 A | * | 4/1991 | Hara et al. ................. 425/575 |
| 5,009,821 A |   | 4/1991 | Weaver |
| 5,030,406 A | * | 7/1991 | Sorensen ................. 264/255 |
| 5,320,869 A |   | 6/1994 | Eisfeller et al. |
| 5,342,666 A |   | 8/1994 | Ellison et al. |
| 5,435,715 A |   | 7/1995 | Campbell |
| 5,435,956 A |   | 7/1995 | McCrory |
| 5,733,049 A |   | 3/1998 | Shimmell |
| 5,756,013 A |   | 5/1998 | Yanagihara et al. |
| 5,817,345 A |   | 10/1998 | Koch et al. |
| 5,863,479 A | * | 1/1999 | Ohsumi et al. ............. 264/162 |

* cited by examiner

*Primary Examiner*—Jan H. Silbaugh
*Assistant Examiner*—Edmund H. Lee
(74) *Attorney, Agent, or Firm*—Grossman, Tucker, Perreault & Pfleger, PLLC

(57) ABSTRACT

A process for formation of a plastic composite includes providing a two part mold system wherein one of the parts is moveable and includes cavities and the other of the parts is stationary and includes cores each having less mass and sequentially moving the moveable mold part with respect to the stationary mold part to form an injection volume between each of said mold cavities of variable capacity.

7 Claims, 3 Drawing Sheets

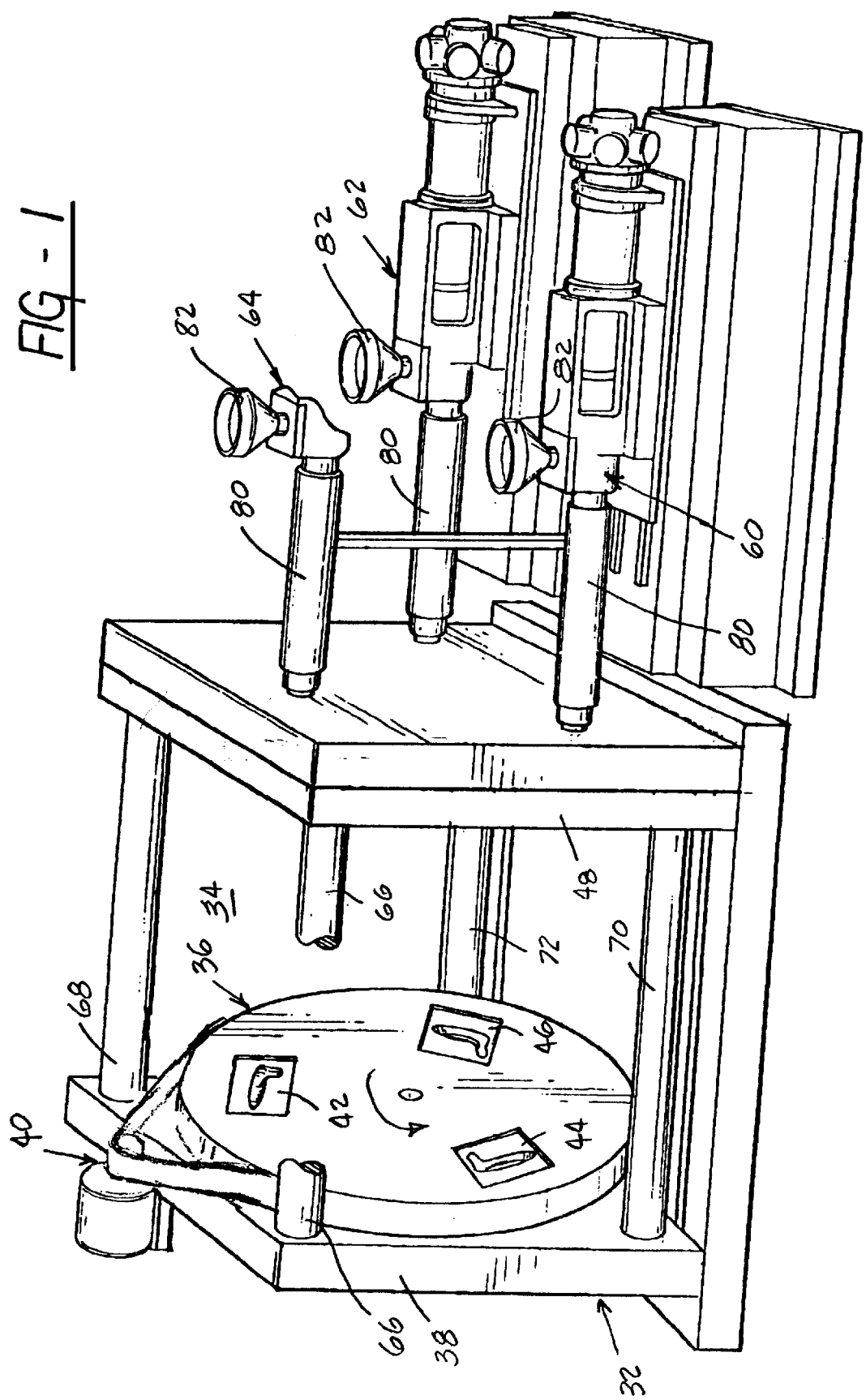

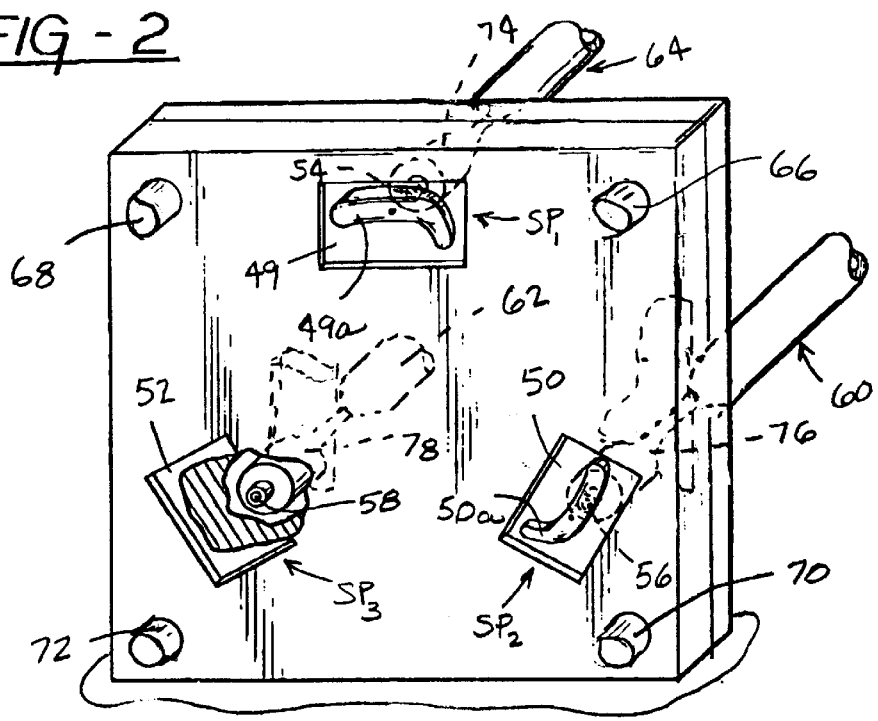
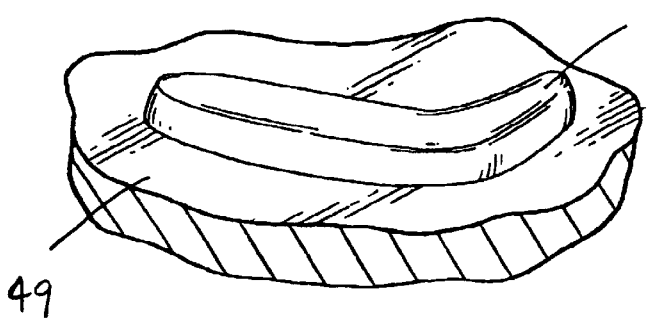
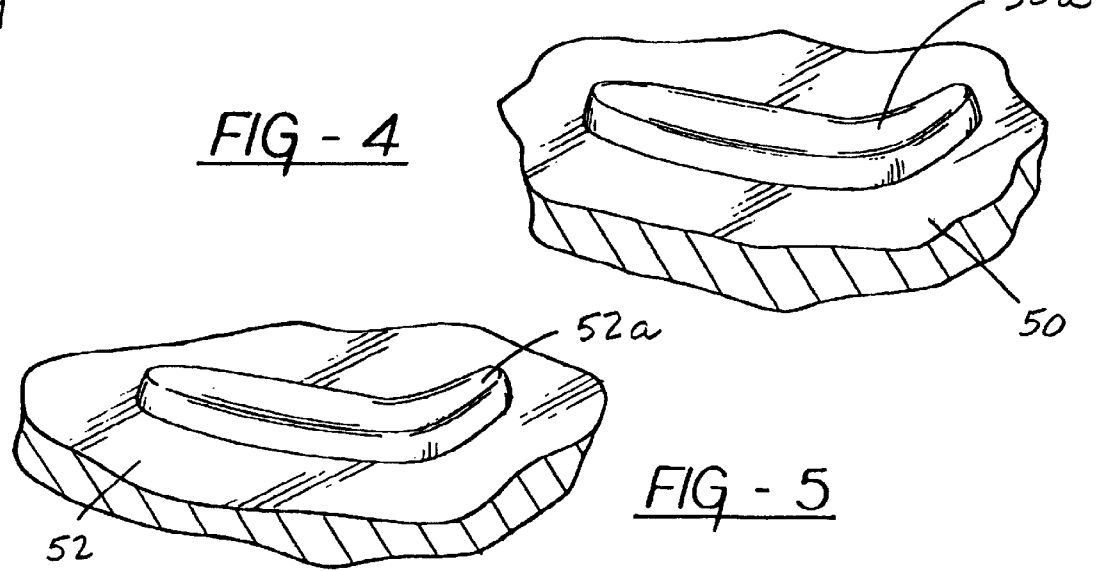

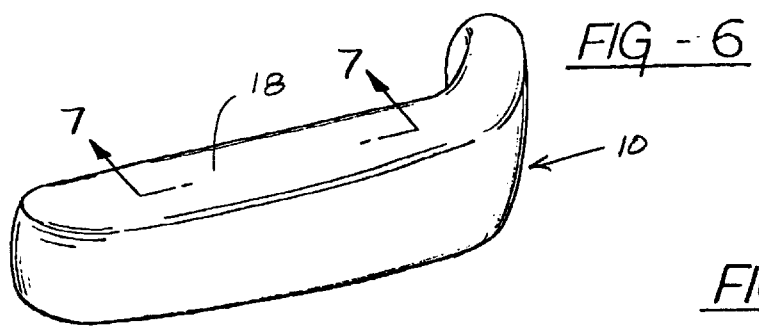
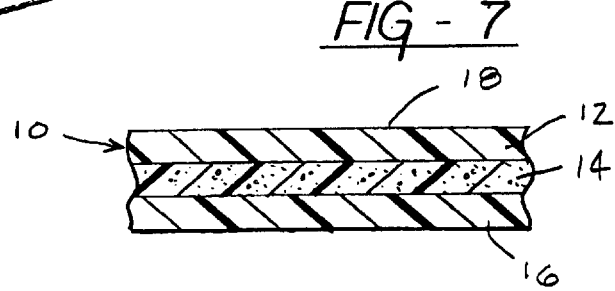
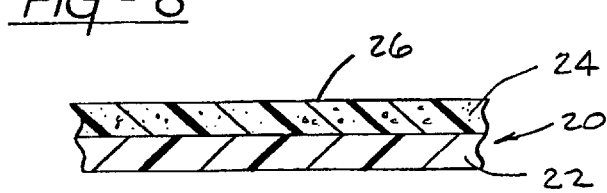
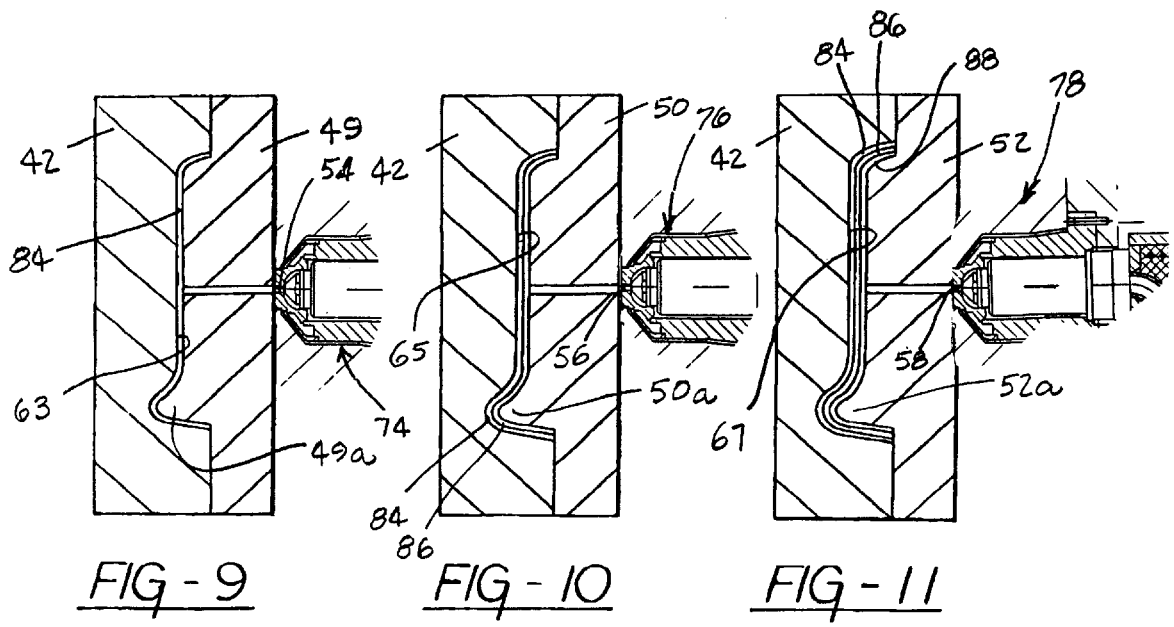

METHOD FOR FORMING A COMPOSITE PRODUCT

TECHNICAL FIELD

This invention relates to plastic composites and more particularly to plastic composites having one or more colors or multiple congruent layers formed by injection molding.

BACKGROUND OF THE INVENTION

Various proposals have been suggested and practiced for the manufacture of plastic composites for use as automotive interior trim and exterior trim products.

One approach is to form metal or plastic substrates and applying multiple coatings thereon to produce a high gloss class A surfaced part. The substrates can be formed from steel, or anyone of a wide range of known plastic materials such as ABS, L ABS, ABS/PC blends, PU, TPO, PET, PBT or other equivalent high strength plastic material suitable for injection molding of a product shape. The coatings for such substrates may be selected from known coatings such a primer coat, an adhesion promoter, a base coat and a clearcoat, and in the case of metals, an electrodeposition coat. Examples of such coatings are set forth in U.S. Pat. Nos. 4,681,811 and 5,320,869. The solvents used in such systems can cause undesirable emission problems.

Another approach is to form a paint film and inject polymeric material behind the paint film to produce a part with a desired color match on its exposed class A surface. Examples of known paint film and injection molded plastic parts are shown in U.S. Pat. Nos. 5,432,666 and 5,009,821. Such systems require the separate manufacture and handling of the film. Furthermore, the film is at times difficult to shape depending upon the contour of the part being produced.

Still another approach to providing a colored plastic part is to provide an enamel coating that will reduce emissions while producing a crater resistant surface on the part being coated. One such system is set forth in U.S. Pat. No. 4,396,680. Such systems require use of conventional coating systems and baking ovens to form a finish on the substrate that has the desired appearance.

Yet another approach is to provide laminating equipment in which a color layer is formed by extrusion and then connected to a substrate. U.S. Pat. No. 4,349,592 discloses the use of such technique in the manufacture of a decorative molding exterior trim part.

Still another approach is to form amber-red-clear tail lamp housings by progressive molding a large clear housing and depositing smaller non-congruent red and amber layers thereon.

While the various methods are suitable for their intended purpose, they all involve processing considerations that either produce emissions or require unnecessary handling of one or more layers of material in the manufacture of a composite exterior or interior trim product having a desired class A type surface appearance color matched to adjacent vehicle components.

Thus, there is a continuing need in this field or art for an article and its method of manufacture that will obviate the above problems.

SUMMARY OF THE INVENTION

Accordingly, it is an object of the present invention to provide a colored plastic composite multi-layered injection molding system.

Another object is to provide such a colored plastic composite having first and second layers of injection molded material in a common cavity and arranged in overlying relationship to form a base layer and a top layer that covers the base layer without removal from a tool and wherein the top layer constitutes a finished surface covering of the composite in which the base layer comprises injection molded polymeric material having colors blended therein and the top layer comprises injection molded polymeric material with or without light reflective particles embedded therein for changing the color effect of said colors when the composite is viewed from different angles.

Still another object of the invention is to provide such a colored plastic composite having first and second layers of injection molded material in overlying relationship to form a base layer and a top layer that covers the base layer without removal from a tool and wherein the top layer constitutes a finished surface covering of the composite in which the base layer comprises injection molded polymeric material having colors blended therein from the group consisting of pigments and/or dyes and/or light reflective particles and wherein the top layer is injection molded clear polymeric material.

Yet another object of the invention is to provide a colored plastic composite having first and second layers of injection molded material in directly molded relationship to form a base layer and a top layer without removal from the tool that covers the base layer and wherein the top layer constitutes a finished surface covering of the composite and the base layer comprises injection molded polymeric material having particles blended therein comprising either or both pigments or dyes and with or without light reflective particles embedded therein and the top layer of injection molded material is a polymeric material for protecting the base layer.

Another object of the invention is to provide a colored plastic composite having a base layer, an intermediate layer and a top layer that covers the base layer and the intermediate layer and wherein the top layer constitutes a finished surface covering of the composite wherein the base layer comprises injection molded polymeric material having colors blended therein; the intermediate layer comprises injection molded polymeric material having light reflective particles embedded therein for changing the color effect when the composite is viewed from different angles and the top layer injection molded polymeric material.

A further object is to provide the colored plastic composite of the preceding object wherein the protective top layer is a clear polymeric material; or a polymeric injection molded material having an exterior glossy surface with a D.O.I. (distinctness of image) reading in the range of 75–100.

According to the invention another object is to provide a process for manufacturing a multi-layer composite product of injection molded plastic comprising providing a moveable mold part and a plurality of stationary mold parts of congruent shape; sequentially moving the moveable mold part with respect to the stationary mold parts to form one or more mold cavities of progressively greater capacity between the mold parts and injecting at least one layer of polymeric material into one of the mold cavities to produce an enhanced colored appearance on the viewing surface of the composite product.

Another object is to provide such a process wherein a cover layer is injected into one or more of the mold cavities by providing polymeric material having colors blended therein to provide a colored appearance in the injection molded composite product.

Still another object is to provide such a process further comprising providing polymeric material with or without light reflective particles embedded therein and injecting it into one of the mold cavities.

Yet another object is to provide such a process of further comprising injecting into one of the mold cavities polymeric material having either or both colored pigments or dyes and light reflective particles blended therein.

Still another object is to provide such a process further comprising injecting polymeric material with colored pigments or dyes into one of the cavities and injecting polymeric material with light reflective particles therein for changing the color effect of said colored pigments or dyes when the composite is viewed from different angles.

Yet another object of the invention is to provide such a process further comprising injecting polymeric material into the mold cavities for covering the polymeric material injected in progressively increasing volume mold cavities of congruent shape.

Another object is to provide such a process further comprising injecting a covering of polymeric material into one of the mold cavities and injecting polymeric material having colors or dyes into one of the mold cavities to form a congruent layer of material against the covering.

Another object of the invention is to provide such a process including providing more than one rotational mold halves and providing more than one stationary mold sections of congruent shape and providing progressively greater capacity mold cavities by varying dimensions of the stationary mold sections.

Still another object is to provide the process of the preceding object by wherein the rotational mold halves and stationary mold sections are respectively provided as mold covers and mold cores.

Yet another object is to provide the process of the preceding object wherein the material is injected into a first mold cavity on one of the covers and rotating the cover and moving it to a second core to form a second mold cavity of a shape congruent to the first mold cavity for injecting additional material against the material previously deposited on the cover.

Yet another object of the present invention is to provide a multi-stage sequentially operated injection molding apparatus having at least one rotational mold half and providing more than one stationary mold sections of congruent shape and providing progressively greater capacity mold cavities by varying dimensions of the stationary mold sections.

Still another object of the present invention is to provide the apparatus of the preceding object wherein rotational mold halves and stationary mold sections are respectively provided as mold covers and mold cores.

BRIEF DESCRIPTION OF THE DRAWINGS

The foregoing objects, features and advantages of the present invention will become more apparent from the following description and accompanying drawings wherein:

FIG. 1 is a perspective view of the apparatus of the present invention;

FIG. 2 is a perspective view looking at the face of a stationary platen in FIG. 1;

FIGS. 3–5 are perspective views of mold cores shown in FIG. 2;

FIG. 6 is a perspective view of a composite product formed by the present invention;

FIG. 7 is a cross-sectional view taken along the line 2—2 of FIG. 6 looking in the direction of the arrows;

FIG. 8 is a cross-sectional view of another embodiment of the invention; and

FIGS. 9–11 are sectional views of three different capacity mold cavities produced by the apparatus of FIGS. 1–4.

BEST MODE FOR CARRYING OUT THE INVENTION

A composite product 10 is shown in FIGS. 6 and 7 that is representative of interior trim and exterior trim products that must be color matched to adjacent components within a vehicle structure. In this arrangement the composite product 10 includes an outer layer of injection molded polymeric material 12; an intermediate layer 14 of injection molded polymeric material with or without particles of light reflecting material and a substrate layer 16 of injection molded polymeric material having color pigments or dyes. The outer layer 12 has a smooth glossy outer surface 18 defining a class A surface meeting automotive appearance requirements. The layers 12, 14 and 16 have substantially congruent outer perimeters.

Another composite product 20 is shown in FIG. 8 having a substrate section 22 of injection molded material that includes color and an outer layer 24 of injection molded material of polymeric material with or without light reflecting material. The outer layer 24 has a smooth outer surface 26 that defines a class A surface having smooth glossy appearance that meets both smoothness and distinctness of image (D.O.I.) requirements in automotive applications. In a preferred embodiment the D.O.I. reading is in a range of 75–100.

Each of the aforesaid products can be formed in a process to be described by use of apparatus 30 diagrammatically shown in FIGS. 1–5. Apparatus 30 includes a mold press 32 including an expandable throat section 34. A rotary mold support or rotary platen 36 is carried on a moveable platen 38. The rotary mold support 36 is driven about a horizontal axis by a belt and motor drive system 40. In the illustrated embodiment, the mold support 36 is shown carrying a plurality of mold covers 42, 44, 46 each forming a mold cavity with a polished surface for meeting class A surface finish requirements.

As best shown in FIG. 2, a stationary platen 48 is provided for supporting a plurality of mold cores 49, 50, 52 to be selectively aligned with each of the mold covers 42, 44, 46 in a process to be described.

In FIG. 2, the mold cores 49, 50, 52 are broken away to show a plurality of underlying sprue gates 54, 56, 58 with injectors to direct molten material through passages in the mold cores 49, 50, 52. The molten material is supplied to the injector feed systems 60, 62, 64 of a known type including feed hoppers, extrusion barrels, heaters, and heated manifolds in communication with the sprue gates 54, 56, 58. The mold cores 49, 50, 52 are shown in FIGS. 3–5 respectively as having profiles or displacement mass that varies but with substantially congruent perimeter shapes. In the illustrated embodiment of the invention mold core 49 (shown in FIG. 3) has a three dimensional profile 49a that, when closed against cover 42, will produce a mold cavity 63 to receive an outer layer 12 of injected material forming the class A surface 18.

In FIG. 4, the mold core 50 is shown as having three dimensional profile 50a less than the profile 49a that, when closed against a cover 44 with an outer layer of material injected therein, will define a mold cavity 65 between the mold cover 44 and the mold core 49 that is of progressively greater capacity to accommodate both the outer layer of material retained on the cover 44 and to define a space to receive an intermediate layer 14 of injected material.

In FIG. 5, the mold core 52 is shown as having a three dimensional profile of less mass (volume) than mold core 50 that, when closed against a cover carrying layers 12, 14 will define a cavity 67 between the mold cover and the mold core 52 of still greater capacity to accommodate the previously injected layers 12, 14 that are retained on the cover while defining a space in the closed mold to receive the layer 16 of a composite product.

The press 30 is closed and opened by a drive system not shown that is operative to move the moveable platen 38 on tie bars 66, 68, 70 and 72. The drive system for the press can be of known types including hydraulic cylinders, electric motor driven screw drives with toggle connections and the like as are well known to those skilled in the art and forming no part of the present invention.

More specifically, the mold covers 40, 42, 44 when placed within the mold press 30 are rotated by the rotary mold support 36 with respect to the moveable platen 38. The moveable platen 38 is driven such that the mold covers 40, 42, 44 and the mold cores 49, 50, 52 are closed when the molten material is directed into a mold cavity defined between the cover and the respective mold core sections. The mold covers 40, 42, 44 are separated along a parting line and standard ejectors are employed to either retain molded material on the cover or to remove it during the process to be described.

The mold press 30 includes a hot runner system for supplying the melt into the mold cavities. An injecting system 74, 76, 78 (shown diagrammatically in FIG. 2) includes known hot runners and an injector for each of the gates 54, 56, 58, respectively, and is diagrammatically shown as communicating through passages in each of the mold cores 49, 50, 52, respectively and as communicating with each of the feed systems 60, 62, 64 each having a known screw mechanism 80 that receives a predetermined desired plastic composition from a supply hopper 82. This arrangement enables the process to be tuned for a particular polymer/additive combination that is best suited for application in the process of the present invention to obtain the best resultant color composite of the present invention.

The mold covers 42, 44, 46 and mold cores 49, 50, 52 while shown as three in number can be decreased in number or increased in number and still practice the process of the present invention that generally includes a process for manufacturing a multi-layer composite product of injection molded plastic comprising providing a at least one moveable mold part such as the mold cover 42 and a plurality of stationary mold parts such as the mold cores 49, 50, 52 and sequentially moving the moveable mold part with respect to the stationary mold parts to form more than one mold cavity spaces into which polymeric material is injected and retained as the multi-layer composite product is being formed. When the cavities are aligned with the mold cores 49, 50, 52 they cooperate to define injection volumes or spaces 63, 65, 67 of progressively increased capacity to accommodate the sequentially injected layers of polymeric material. The process produces a product having one layer of polymeric material into one of the mold cavities to produce a smooth glossy appearance on the viewing surface of the composite product as produced by the surface finish on the mold cover defining the cavity portion of the injection mold cavity.

If more than one moveable mold part is provided as shown in FIG. 2 at 42, 44, 46, the process can involve a series of operations including first, second and third shot positions shown at $SP_1$, $SP_2$, $SP_3$ in FIG. 2. As illustrated at $SP_1$ mold cover 42 is first closed against the mold core 49 to define the mold cavity 63 (smallest cavity) that is to be injected with an outer layer of polymeric material; at the same time at $SP_2$ the mold cover 44 that carries a previously injected outer layer of material is closed against the mold core 50 to define the next sized mold cavity 65 in which the intermediate layer of polymeric material is directed; at the same time at $SP_3$ mold cover 46 is closed against the mold core 52 so that the base layer can be injected into the next sized mold cavity 67 against two layers of previously deposited material retained on the mold cover 46. Following injection of the material(s) into the closed molds, the moveable platen 38 separates from the stationary platen 48 and a finished part (comprising three layers of injected material) is ejected from the mold cover 46.

The rotary tool carrier or platen 36 is then rotated to move the mold cover 46 to the first shot mold cavity position $SP_1$ the mold cover 42 is moved to the second shot mold cavity position $SP_2$ and the mold cover 44 is moved to the third shot mold cavity position $SP_3$; the platens are moved to close the mold covers against the mold cores and the first, second and third shots of mold injected material are injected as described above.

The process than continually repeats.

While the process is shown with the mold cavity part carried by the rotary tool carrier or platen 36 the process also contemplates the mold cores being carried on the rotary tool carrier and the mold covers (cavities) carried on the stationary platen 48. In such reversal of locations, the gate will be located such that the first surface formed will be the base; it will be carried on the core to a second station where the intermediate layer will be formed and then to a third station where the finished first surface will be formed on the mold cavity part at the third station.

The process can include an injection shot to form the cover layer that is injected into one or more of the mold cavities by providing polymeric material having colors blended therein to provide an enhanced colored appearance in the injection molded composite product.

Such process, if desired, can further comprise providing polymeric material with or without light reflective particles embedded therein and injecting it into one of the mold cavities.

The process can further comprise injecting into one of the mold cavities polymeric material having either or both colored pigments or dyes and light reflective particles blended therein.

The process can still further comprise injecting polymeric material with colored pigments or dyes into one of the cavities and injecting polymeric material with light reflective particles therein for changing the color effect of said colored pigments or dyes when the composite is viewed from different angles.

The process can still further comprise injecting polymeric material into the mold cavities for covering the polymeric material injected in progressively increasing volume mold cavities having substantially congruent outer perimeter shapes.

The process can further comprise injecting a covering of polymeric material into the mold cavities for covering the first layer of polymeric material in the one of the mold cavities and injecting polymeric material having colors or dyes into one of the mold cavities to form the first layer of material;

The process can also include providing three or more rotational mold halves and providing three or more stationary mold sections and providing progressively greater capacity mold cavities by varying dimensions of the stationary mold sections while retaining congruent outer perimeter shapes.

For a better understanding of the multi-stage sequentially operated injection molding apparatus of the present invention having more than one rotational mold half and providing more than one stationary mold section and providing progressively greater capacity mold cavities by varying dimensions of the stationary mold sections a diagrammatic showing thereof is set forth in FIGS. 9–11 wherein the movement of one of the moveable mold covers or cavity parts is illustrated.

In the sequence of sections shown in FIGS. 9–11, the mold cover 42 is followed as it is positioned at the $SP_1$; $SP_2$; and $SP_3$ locations within the mold press 32 by the process of sequentially advancing the mold cover 42 with respect to the three stationary mold cores 49,50,52 located within the mold press 32 as previously discussed to form one or more mold cavities of similar outer perimeter shape and of progressively greater capacity and injecting at least one layer of polymeric material into one of the mold cavities to produce a colored appearance on the viewing surface of the composite product.

Thus as shown in FIG. 9, the mold cover 42 is positioned on the core 49 when the mold press 32 is closed to form the mold cavity 63. As shown in FIG. 10, the mold cover 42 is positioned on the core 50 when the mold press 32 is closed to form the mold cavity 67 between a layer of material previously deposited at FIG. 9. The core 50 has a section 50*a* of less mass than the core section 49*a* so that a mold cavity of progressively greater capacity is defined thereby so as to accommodate the layer of material deposited in the mold cavity and to provide a mold cavity 67 for injection of a second layer of material. As shown in FIG. 11, the mold cover 42 (with two layers of in tool deposited material) is positioned on the mold core 52 when the mold press 32 is closed. The core 52 has a section 52*a* of less mass than the core section 50*a* so as to form a mold cavity 62 of progressively greater capacity (with similar outer perimeter shape) that will accommodate the previously deposited layers of in tool injected material and to form the mold cavity 67 for deposition of a third layer of injection molded material in the same tool, e.g., the mold cover or cavity part 42.

In accordance with the illustrated equipment, the rotary platen 36 first positions the mold cover 42 in the mold press 32 and it is closed against the mold core 49. At this point in the process a shot of molten polymeric material is injected into the mold cavity 63 by known feed systems shown schematically at 54, 74 and 60. The injected molten material forms, for example, a material layer of clear polymer 84 corresponding to the outer class A surface as shown in the embodiment of FIG. 6. Once injected the clear polymer layer 84 stays with the cover 42. The mold press is opened and the cover 42 is repositioned in the press following reversing of known gating system and ejection plungers.

The mold cover 42 is then closed against the smaller volume core member 50 with the injection molded material 84 remaining thereon as shown in FIG. 10. The mold cavity is partially filled by the material layer 84 and the remaining cavity space 65 is then filled with injection molded polymeric material such as a material layer 86 of clear polymeric material having particles of light reflecting material therein. Again the mold press is opened and the mold cover 42 is repositioned by rotation and then closed against the still smaller volume core member 52 while the previously in-tool injection molded layers 84, 86 remain on the mold cover 42 following reversing of the gating and the ejection pins.

The mold cover 42 is then positioned within the mold press 32 with the injection molded material layers 84, 86 remaining thereon as shown in FIG. 11. The mold cavity 67 is partially filled by the material layers 84,86 and the remaining space is then filled with injection molded polymeric material such as a material layer 88 of clear polymeric material having pigment particles of color therein. The mold press is opened and the material layers 84, 86, 88 are then removed from the mold cover 42 by hydraulically actuated ejector pins as a unitary, in-tool formed part.

The arrangement enables a wide range of products to be produced by a duplication of tool sets with it being understood that the schematically shown tooling is that required for a part with three layers of injection mold polymeric material of substantially congruent perimeter shape. For parts with two or one layer of such injection mold polymeric material the number of cores and presses can be reduced in like number.

In practicing the invention in order to obtain a class A surface on the product the cover cavity is polished. Three polymer pours are directed into the cavity as it is progressively advanced with respect to the core sections of progressively less mass (to define a progressively greater volume mold cavity while retaining congruent perimeters). Suitable epoxy ejectors are provided in conjunction with the cover and suitable gating is provided along with mold runs to direct the polymeric material into the mold cavity during the sequential shots of material into the mold cavity.

All injection moldable polymeric materials are suitable for the various layers including both thermoplastic and thermoset materials.

Suitable materials for imparting color to the products for matching adjacent parts of a vehicle include any organic or inorganic pigment or dye of any class or variety as well known to those skilled in the art.

Suitable light reflective material types for imparting brightness to a layer include mica flakes or any other suitable light reflective material.

INDUSTRIAL APPLICABILITY

The article, apparatus and method of the present invention is especially suitable for manufacture of in-tool multiple layer injection molded parts for use any automotive and other applications and including products such as door panels, consoles, kick panels, luggage racks and the like and for manufacture in the field of automotive exterior trim components such as wheel covers, bumper fascia, exterior door panels, skirts and the like. The process is also applicable to the manufacture of other color composite plastic articles including but not limited to luggage housing and electronic equipment housings.

Variations and modifications are possible without departing from the scope and spirit of the present invention as defined by the appended claims.

What is claimed is:

1. A process for manufacturing a multi-layer composite product of injection molded plastic comprising providing a moveable mold part comprising at least a first mold cavity;

providing a stationary mold part comprising at least a first mold core and a second mold core, the second mold core having less mass than the first mold core;

aligning the first mold cavity with the first mold core, the first mold cavity and the first mold core having a first injection volume;

injecting a first polymeric material through the first core and into the first injection volume to form a first layer;

sequentially moving the moveable mold part having said first mold cavity and said first layer with respect to the stationary mold part to selectively align the first mold cavity with said first layer with the second mold core, the first mold cavity and the second mold core having a second injection volume, the second injection volume being greater that the first injection volume;

injecting a second polymeric material through the second core into the second injection volume such that the second polymeric material is injected against the first layer to form the composite product and providing either the first layer of the polymeric material or the second layer of polymeric material with pigments or dyes to produce a colored appearance on the viewing surface of the composite product and to produce a covering surface congruent to the second layer of polymeric material for enhancing the appearance of the first layer of polymeric material.

2. The process of claim 1 further comprising providing the second polymeric material with colored pigments or dyes blended therein.

3. The process of claim 1 further comprising providing a selected one of the first and the second polymeric material with light reflective particles embedded therein.

4. The process of claim 1 further comprising providing a selected one of the first and the second polymeric material with either or both colored pigments or dyes and light reflective particles blended therein.

5. The process of claim 1 further comprising providing polymeric material with colored pigments or dyes; injecting said polymeric material with colored pigment or dyes as the first polymeric material as the first layer and thereafter providing the second polymeric material with light reflective particles therein and injecting the second polymeric material as the second layer, the second polymeric layer changing the color effect of said colored pigments or dyes when the multi-layer composite product is viewed from different angles.

6. The process of claim 1 wherein the step of injecting the first or second layer of polymeric material comprises injecting a clear polymeric material.

7. The process of claim 1 wherein said stationary mold part comprises at least a third mold core, the third mold core having less mass than the second mold core;

aligning the first mold cavity having said composite product with the third mold core, the first mold cavity and the third mold core having a third injection volume, the third injection volume being greater than the second; and injecting a third layer of polymeric material through the third core and into the third injection volume to form a third layer.

* * * * *